July 10, 1923.

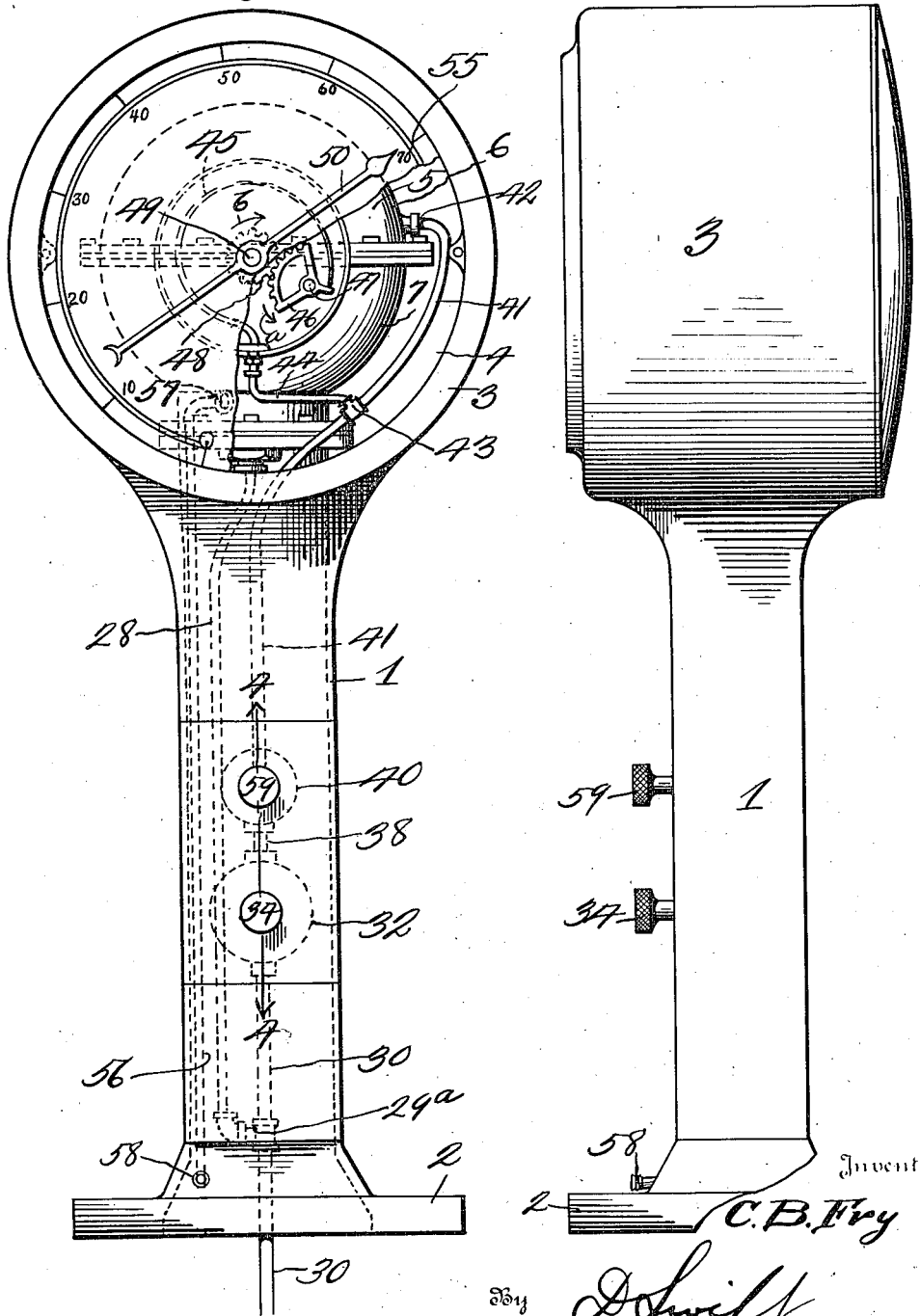

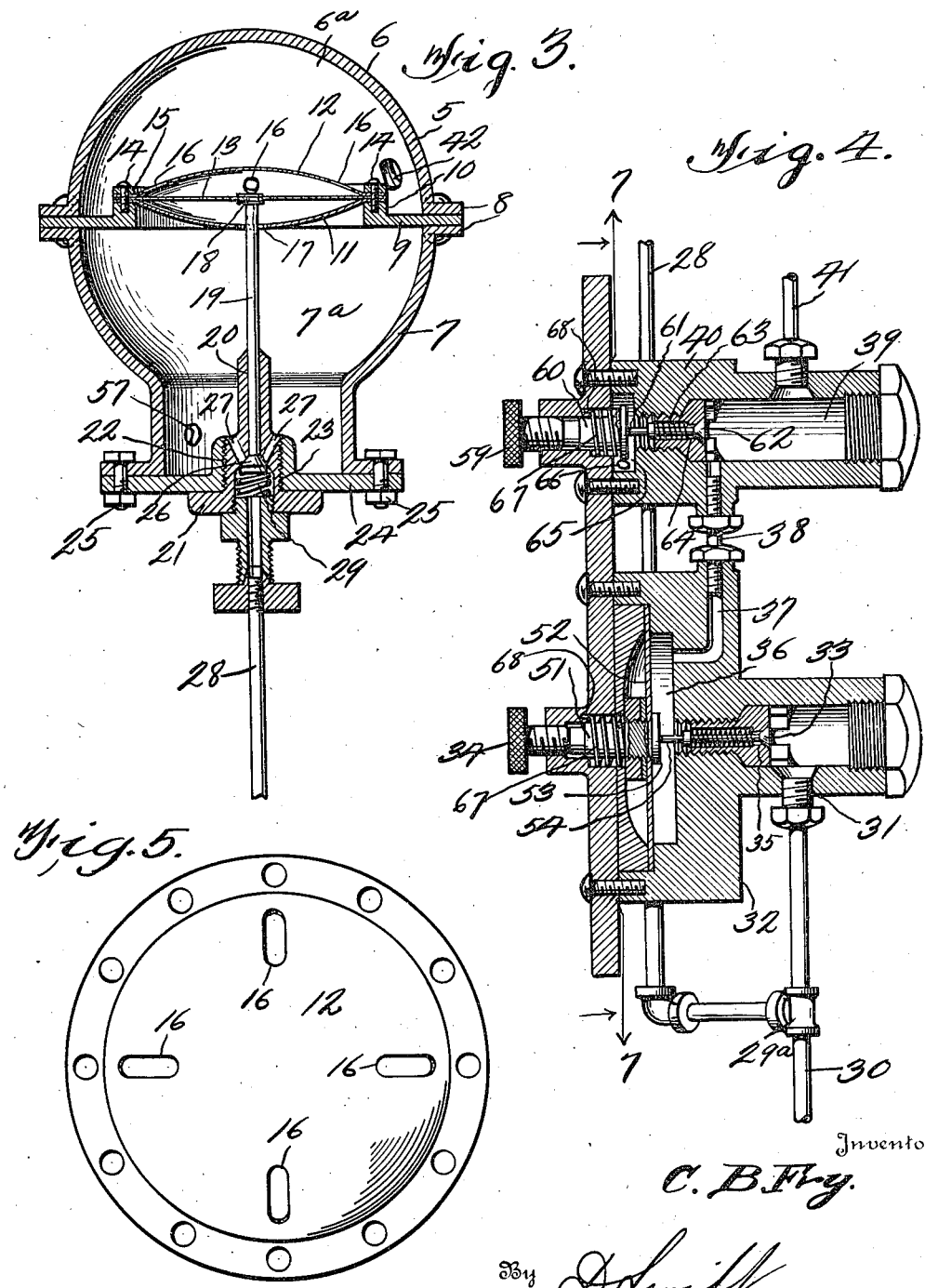

C. B. FRY 1,461,389

AIR DISPENSING DEVICE

Filed March 8, 1922

Inventor
C. B. Fry
By D. Swift
Attorney

Patented July 10, 1923.

1,461,389

UNITED STATES PATENT OFFICE.

CLAUD B. FRY, OF YATES CENTER, KANSAS.

AIR-DISPENSING DEVICE.

Application filed March 8, 1922. Serial No. 542,197.

*To all whom it may concern:*

Be it known that I, CLAUD B. FRY, a citizen of the United States, residing at Yates Center, in the county of Woodson, State of Kansas, have invented a new and useful Air-Dispensing Device; and I do hereby declare the following to be a full, clear, and exact description of the invention, such as will enable others skilled in the art to which it appertains to make and use the same.

The invention relates to air dispensing devices, and has for its object to provide a device of this character particularly adapted to use in automobile service stations and so constructed that air may be delivered to a tire at a predetermined pressure and in such a manner that over-inflation of the tire will be prevented.

A further object is to provide an air dispensing device comprising a dome having upper and lower chambers and a diaphragm separating said chambers. The upper chamber of the dome having connected thereto an air supply pipe valve controlled whereby a predetermined pressure within the upper chamber may be maintained. The pressure in the lower chamber being maintained through a valve controlled by the diaphragm in such a manner that when the pressure in the lower chamber drops, the valve will be opened and the pressure in the lower chamber raised to equalize the pressure in the upper chamber at which time the valve will automatically close.

A further object is to provide a valve in the supply pipe line, said valve forming means whereby air may be exhausted to the atmosphere, from the upper chamber when it is desired to lower the pressure therein.

A further object is to provide a discharge pipe connected to the lower chamber of the dome, and through which discharge pipe, air at a predetermined pressure is delivered to a tire or the like.

A further object is to provide a pressure gage in connection with the pipe line leading to the upper chamber, whereby the pressure in the upper chamber will be indicated.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1 is a front elevation of the device, part of the dial being broken away to better show the structure.

Figure 2 is a side elevation.

Figure 3 is a vertical sectional view through the dome.

Figure 4 is a vertical sectional view through the valves taken on line 4—4 of Figure 1.

Figure 5 is a top plan view of the flexible diaphragm plate.

Figure 7:
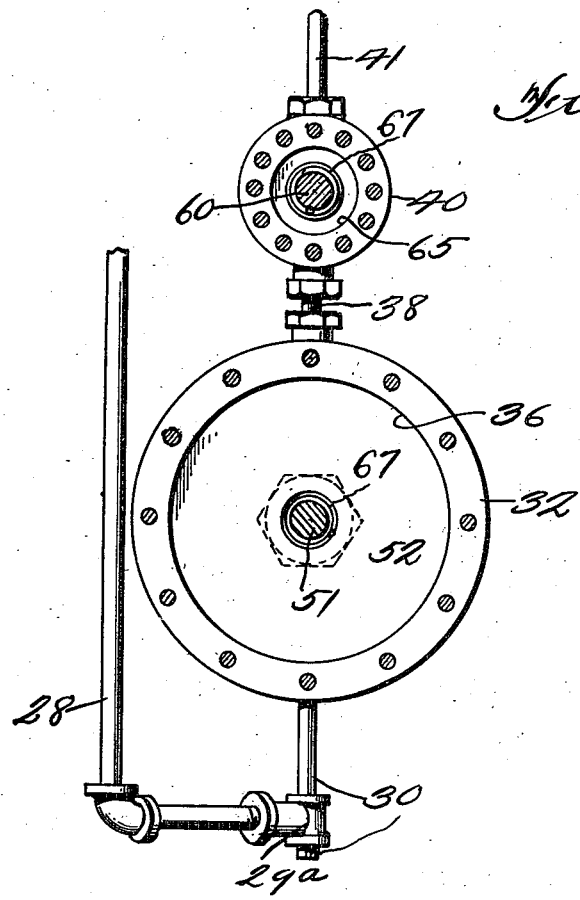
Figure 7 is a vertical sectional view through the valve taken on line 7—7 of Figure 4.
Figure 6:
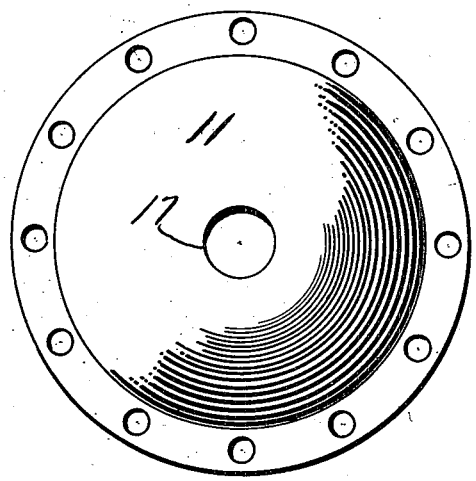
Figure 6 is a plan view of the lower diaphragm protecting plate.

Referring to the drawings, the numeral 1 designates a vertically disposed casing, and 2 the base thereof, which base may rest on any kind of a support, preferably a concrete support. The device is primarily for use in connection with automobile service stations. The upper end of the casing 1 terminates in a cylindrical casing 3, in the chamber 4 of which a spherical dome 5 is disposed. The dome 5 is formed from two semi-spherical members 6 and 7, which members are provided with flanges 8, which are secured together. Interposed between the flanges 8 is a horizontally disposed ring 9 having an upwardly extending flange 10. Disposed on the upper side of the flange 10 is a downwardly convexed plate 11, there being an upwardly convexed plate 12 above the plate 11, and between said plates 11 and 12 the diaphragm 13 is disposed and held by means of screws 14 which pass through the ring 15, said plates 11 and 12, the diaphragm 13, and into the flange 10. It will be seen that the diaphragm is supported rigidly and in a position where it may flex incident to the variation of pressure in the dome chamber 6ª and in the dome chamber 7ª. The plates 11 and 12 protect the diaphragm 13 and are provided with apertures 16 and 17, whereby the air pressure within the chambers may reach the diaphragm for flexing the same. Secured at 18 to the diaphragm and extending downwardly in a vertical position through the aperture 17 and plate 11 is a valve stem 19. The valve stem 19 is slidably mounted in a bearing 20 of a valve casing 21, which is threaded at 22 into the flanged opening 23 of the horizontally disposed plate 24. The plate 24 closes the lower end of the lower chamber 7ª and is secured to the dome section 7 by means of bolts 25 in such a manner as to prevent escape of air. The lower end of the valve stem 19 is provided with a valve 26, which normally closes the ports 27 which are in communication with the lower air chamber 7ª and prevents passage of air from the branch air supply pipe 28 to the chamber 7ª, except when the valve 26 is unseated by a downward flexing of the diaphragm 13. The valve 26 is normally held in closed position by the diaphragm 13 and by the coiled spring 29. The lower end of the branch air supply pipe 28 is connected at 29ª to the main air supply pipe 30, which pipe leads to a storage tank in which pressure is maintained. The pipe 30 which is the main air supply pipe is connected at 31 to the main valve casing 32, and when the valve 33 is unseated by an inward screw of the control screw 34, the air passes through the port 35, chamber 36, port 37, pipe 38 and into the chamber 39 of the auxiliary valve 40. After the air passes through the chamber 39, it enters the pipe 41, which is connected to the upper section 6 of the air dome 5 at 42 and supplies pressure to the chamber 6ª, which pressure is also on the upper side of the diaphragm 13. Connected to the pipe 41 at 43 is a gage pipe 44 which terminates in a loop 45, which loop expands when pressure enters the same, and tends to straighten out. As the pipe 45 straightens out the rack segment 46 is rocked on its pivotal point 47 in the direction of the arrow a, thereby causing the gear 48 to move in the direction of the arrow b and consequently move the shaft 49 which carries the pointer 50 in the same direction. In operation when it is desired to inflate the tire at a predetermined pressure, the operator screws the operating screw 34 inwardly thereby moving the shaft 51 inwardly and consequently flexing the diaphragm 52 inwardly. The diaphragm forms a tight packing and may be formed from any kind of material desired. However the diaphragm 52 is forced inwardly, the member 53 engages the valve stem 54 and forces the same inwardly, thereby unseating the valve 33 and allowing air to pass through the port 35, chamber 36, port 37, pipe 38, chamber 39, and into the pipe 41, and thence to the upper chamber 6ª of the dome. At the same time the pressure will operate the pointer 50 which cooperates with the dial 55, and when the operator sees that the proper pressure for the particular tire being filled is indicated on the dial 55 in Figure 1, for instance seventy pounds, he immediately unscrews the operating screw 34 which will allow the valve 33 to reseat and consequently the pressure within the chamber 6 will be maintained at seventy pounds. It will be noted that the pressure will be seventy pounds on the upper side of the diaphragm 13. However as the pressure rises in the upper chamber 6ª, the diaphragm 13 is forced downwardly, which action unseats the valve 26 and allows air to pass into the lower chamber 7ª from the branch pipe 28, which is connected to the main supply pipe 30 at a point below the valve. As the pressure in the chamber 7ª rises to a point where it equalizes with the pressure in the upper chamber 6ª, the diaphragm will move upwardly and seat the valve 22, thereby shutting off passage of additional air to the lower chamber 7ª, therefore it will be seen that seventy pounds of pressure is in the lower chamber 7ª, and the air may be dispensed to automobile tires through the pipe 56, which is connected at 57 to the lower section 7 of the dome 5 and in communication with chamber 7ª of the dome. The pipe 56 preferably leads downwardly and terminates in an outwardly extending threaded end 58, to which may be coupled a conventional form of air hose having the usual valve at its discharge end. When it is desired to reduce the amount of pressure within the upper chamber 6ª, for instance to reduce the same from seventy to six pounds, the operator screws inwardly on the screw 59 which forces the shaft 60 inwardly into engagement with the valve stem 61, thereby unseating the valve 62 against the action of its spring 63, and allowing air to pass through the port 64 to the chamber 65 and thence to the atmosphere to the port 66, and consequently allowing the pressure within the chamber 6ª to be reduced to the desired amount, at which time the screw 59 is unscrewed, thereby allowing the valve 62 to again seat, and the exhaust of air to the atmosphere to be stopped.

From the above it will be seen that an air dispensing device is provided, which is positive in its operation, the pressure of the air delivered to a tire regulated in such a manner that over inflation of a tire is prevented and that pressure above a predetermined amount is prevented. It will also be seen that an air dispensing device is provided, which is simple in construction, and one which is particularly adapted for use in connection with automobile stations.

The shaft 60 and the shaft 51 are pulled out of position so as to follow the screws 34 and 59 in their outward movement by means of coiled springs 67 the outer ends of which are anchored at 68 and the inner ends connected to the shafts.

The invention having been set forth what is claimed as new and useful is:—

1. An air dispensing device, said device comprising a dome, upper and lower chambers in said dome, a diaphragm interposed between the chambers, means for supplying air pressure to one of said chambers at a predetermined pressure, means whereby air will be supplied to the other chamber at an equal pressure, said means being controlled by the diaphragm.

2. An air dispensing device comprising a dome having upper and lower chambers therein, a diaphragm interposed between said upper and lower chambers, an air supply pipe connected to the dome and in communication with the upper chamber, a valve carried by the lower portion of the dome and actuated by a downward flexing of the diaphragm, an air supply pipe connected to the dome and in communication with the lower chamber and normally closed by the diaphragm actuated valve, an air gage in connection with the air supply pipe of the upper chamber, said diaphragm forming means whereby the pressure within the both chambers will be equalized.

3. An air dispensing device comprising a dome having upper and lower chambers, a diaphragm interposed between said chambers, a downwardly extending valve stem carried by the diaphragm, a valve carried by the lower end of the valve stem and cooperating with a valve seat, said valve normally preventing the passage of compressed air to the lower chamber, an air supply pipe connected to the upper chamber, means whereby a predetermined amount of air may be supplied to the upper chamber at a predetermined pressure, said diaphragm forming means whereby the valve stem carried thereby will be forced downwardly and air admitted to the lower chamber until the pressure therein is equalized with the pressure in the upper chamber.

4. An air dispensing device comprising a casing having spaced air chambers, a diaphragm interposed between said chambers, means whereby air may be supplied to one of said chambers at a predetermined pressure, means connected to said diaphragm whereby pressure in the other chamber will be equalized with the first mentioned pressure in the first mentioned chamber, means whereby the pressure within the first mentioned chamber may be limited or reduced and means whereby the air from the second mentioned chamber may be utilized.

5. An air dispensing device comprising a supply pipe, a casing having spaced chambers, said air supply pipe being connected to one of said chambers, a pipe connecting the air supply pipe with the other chamber, valve means for admitting air to the first mentioned air chamber to a predetermined pressure, a diaphragm between said chambers, said diaphragm forming means whereby the pressure within the chambers will be equalized.

6. The combination with an air dispensing device comprising spaced casings having chambers therein, a diaphragm, a valve actuated by said diaphragm in such a manner that the pressure within the chambers will be equalized, of valve means whereby the pressure in one of the chambers may be regulated, and valve means whereby the pressure within said last named chamber may be reduced to a predetermined amount.

In testimony whereof I have signed my name to this specification in the presence of two subscribing witnesses.

CLAUD B. FRY.

Witnesses:
S. H. HOGUELAND,
H. A. CHERRYHOLMES.